United States Patent Office 3,302,085
Patented Jan. 31, 1967

3,302,085
LOAD CONTROL SYSTEMS USING MAGNETIC AMPLIFIERS AND CONTROLLED RECTIFIERS
Leonard R. Hulls, Gwynedd Valley, and Rolland H. Henderson, North Wales, Pa., assignors to Leeds & Northrup Company, a corporation of Pennsylvania
Filed July 9, 1963, Ser. No. 293,725
9 Claims. (Cl. 318—207)

This invention relates to control systems using magnetic amplifiers for control of the excitation circuits of motors and other electrical load devices.

In accordance with the present invention, the pulse output of a magnetic amplifier is directed by polarity-sensitive means to one or the other of two signal channels in dependence upon the polarity of the output pulses. Rectifiers respectively associated with the signal channels produce isolated D.C. output signals which more particularly are used to gate controlled rectifiers for selective energization of a motor or other load device in accordance with the polarity of the D.C. input of the amplifier.

Further in accordance with the invention, in systems having more than one controlled recifier per signal channel, there is provided an amplitude-responsive means which precludes gating of any of the controlled rectifiers unless the pulse amplitude is sufficiently high to insure gating of all of them.

Further in accordance with the invention, the control system includes means which in response to selective energization of the controlled device from an A.C. power source is effective intermittently to interrupt production of the D.C. output signal of the selected signal channel. In one form of the invention, such means includes a time-delay network or equivalent producing a negative feedback D.C. input signal for the amplifier whereas in another form of the invention such means resets a trigger circuit serving as the aforesaid amplitude-responsive means.

Also in accordance with the invention, when the controlled load device is a motor for positioning a valve or other final control element, a D.C. voltage in polarity and magnitude dependent upon the direction of rotation and speed of the motor is applied as an amplifier input signal opposing the error signal which intially caused energization of the motor. For automatic control of the final control element, the error signal input of the amplifier may be derived from opposed D.C. signals respectively representative of the position of such elements and of the magnitude of a measured variable such as temperature: the system also includes a manual control network to which transfer may be made without introduction of an abrupt change in the control action. The manual control network includes switches selectively manually operable to produce a D.C. command signal of either polarity and of preset adjustable magnitude.

The invention further resides in control systems having features herein described and claimed. Certain features herein disclosed but not claimed are claimed in copending application Serial No. 291,942, filed July 1, 1963.

For a more detailed understanding of the invention, reference is made to the following description of systems embodying it and to the attached drawdings in which.

Figure 1:
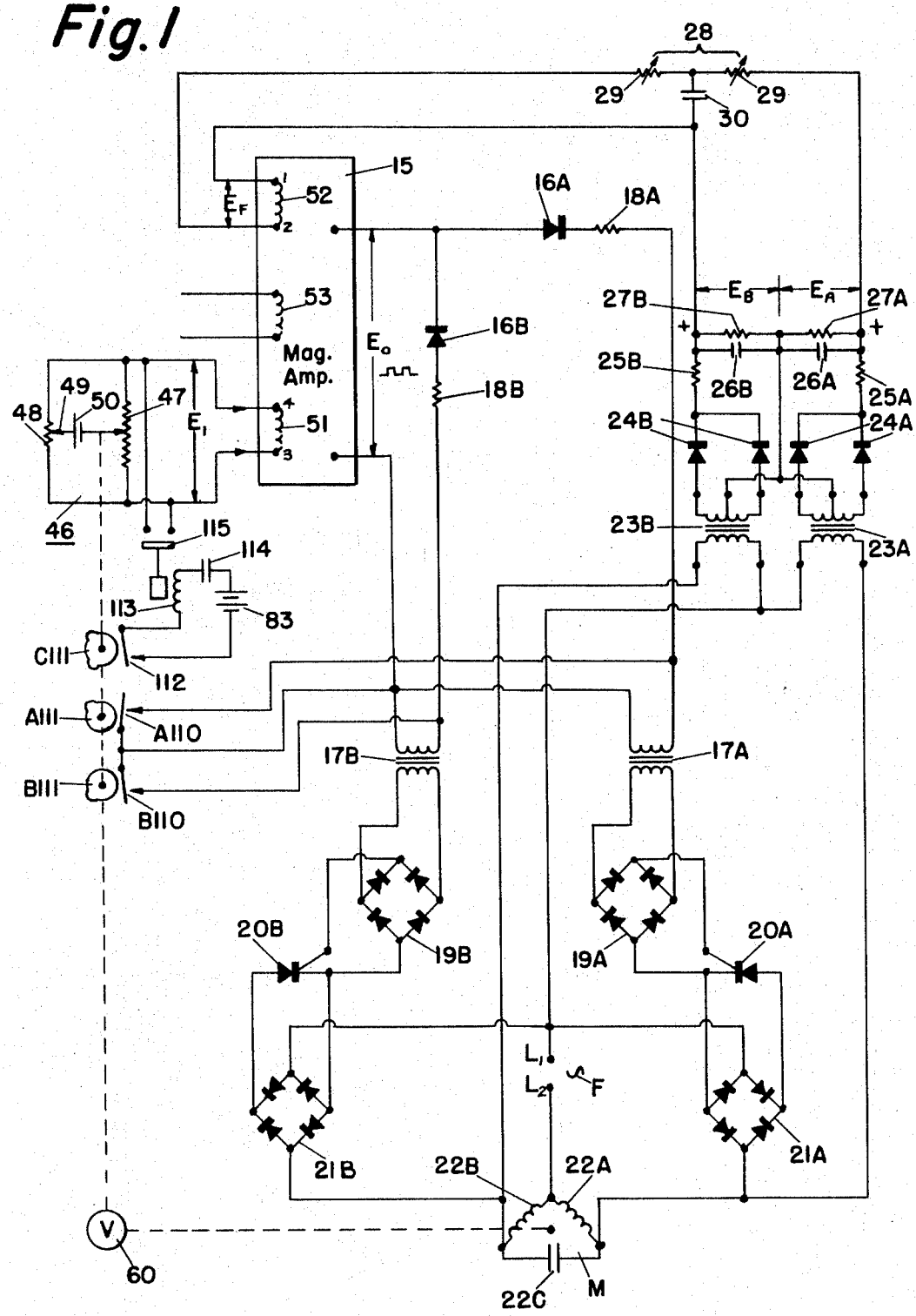
FIG. 1 illustrates a control system for selective energization of a motorized drive unit from a single-phase power source.

Referring to FIG. 1, the input signal $E_1$ applied to the terminals 3, 4 of amplifier 15 may be a D.C. voltage representative of the changes in magnitude of a measured variable such as pressure, temperature or other condition; or it may be representative of a change in position of a control element. For purposes of explanation, it may be assumed that the input voltage $E_1$ is produced by a network 46 including the slidewires 47, 48 and a D.C. source exemplified by battery 50. With the contacts of the sidewires 47, 48 in corresponding position, the signal voltage $E_1$ is of zero magnitude: with the control contact 49 displaced in one direction from such corresponding position, the voltage $E_1$ is of positive polarity and of magnitude corresponding with the extent of the displacement: with control contact 49 displaced in opposite direction from such position of correspondence, the voltage $E_1$ is of negative polarity and of magnitude corresponding with the extent of the displacement. As more fully discussed in connection with FIG. 2, the amplitude and polarity of the output pulses $E_O$ of the amplifier are determined by the net amplitude and polarity of the input signal: the repetition rate of the output pulses corresponds with the core-switching frequency of an oscillator included in the amplifier 15. The repetition frequency $F_1$ is suitably high—for example 5 kilocycles per second.

In dependence upon their polarity, the output pulses of the amplifier are directed to one or the other of two signal channels respectively including the isolation transformers 17A, 17B. Specifically, output pulses of one polarity for example, positive pulses, are passed by diode 16A through the primary winding of transformer 17A and resistor 18A in series therewith. The resulting output of the secondary of transformer 17A is an A.C. signal of frequency $F_1$ which is full-wave rectified by the diode bridge 19A and applied to the gating and cathode electrodes of a solid state controlled rectifier 20A.

With the controlled rectifier 20A turned ON by the gating signal of the associated signal channel, it provides a path for flow of current from the A.C. power line $L_1$, $L_2$ through the diode rectifier bridge 21A and the load M. The power line frequency $F_2$ is low, for example 60 cycles, compared to the gating signal frequency $F_1$. With the rectifier 20A turned ON, power is supplied to the load M from the line for both half-waves of the power-line frequency. Specifically, the load M may be a split-phase motor coupled to a valve 60 or other final control element and to the contact of the slidewire 47. Concurrently with adjustment of the valve, the network 46 is thus rebalanced at the existing position of the control contact 49 of slidewire 48.

With the rectifier 20A turned ON, the winding 22A of the split-phase motor is connected directly across the line by the bridge 21A and the winding 22B of the motor is connected across the line through the phase-splitting capacitor 22C.

When the amplifier output pulses $E_O$ are of opposite or negative polarity, they are directed by diode 16B through the primary of transformer 17B and resistor 18B of the second signal channel. The resulting output of transformer 17B is an A.C. signal of frequency $F_1$ which is full-wave rectified by the diode bridge 19B and applied to the gate electrode circuit of controlled rectifier 20B. With the controlled rectifier 20B turned ON, the power rectifier bridge 21B supplies both half-waves of the power frequency $F_2$ to the motor M or other load device. Specifically, for amplifier output pulses $E_O$ of negative polarity, the motor M is excited for rotation in direction opposite to that previously described because winding 22B of the motor is now connected directly across the power line and winding 22A is connected thereto through the phase-splitting capacitor 22C.

With the arrangement as thus far described, the motor M is selectively energized to rotate in one or the other direction in dependence upon the polarity of the input signal $E_1$ applied to the amplifier and continues to run until balance of the network 46 is restored. There is now described additional circuitry which controls the speed at which the motor approaches the balance point in avoidance of overshooting or hunting.

The high impedance primary windings of signal transformers 23A, 23B are respectively connected across the power diode bridges 21A, 21B to produce an output signal voltage of frequency $F_2$ which represents the state of the associated bridge. With bridge 21A in OFF state, the resulting A.C. output voltage of transformer 23A is rectified by the diodes 24A—24A smoothed by the RC filter comprising resistor 25A, capacitor 26A and appears as a D.C. voltage $E_A$ across the resistor 27A. Similarly, with bridge 21B in OFF state, the resulting A.C. output voltage of transformer 23B is rectified by diodes 24B—24B and smoothed by filtering network 25B, 26B and appears as a D.C. voltage $E_B$ across the resistor 27B.

The resistors 27A, 27B are connected in series with their end terminals connected to the similarly poled rectifiers 24A, 24B and with their common terminal connected to the center taps of the secondary windings of transformers 23A, 23B. Consequently when both bridges 21A and 21B are OFF, the voltages $E_A$, $E_B$ across the double filter circuit are equal and opposite and their sum $E_F$ as applied to the input terminals 1, 2 of amplifier 15 is zero. When one of the bridges 21A, 21B is switched ON, a corresponding one of the oppositely poled D.C. voltages $E_A$, $E_B$ is applied as a negative feedback signal to the input terminals 1, 2 of amplifier 15 via the delay network 28 exemplified by resistors 29 and capacitor 30. Accordingly, when the control rectifier 20A is turned ON by amplifier output pulses $E_O$ of proper polarity, the voltage developed across the secondary of transformer 23A is reduced and the voltage $E_A$ decays. A voltage $E_F$ will gradually build up with terminal 1 of input winding 52 more positive than terminal 2. If the input signal $E_1$ that turned ON control rectifier 20A is small, then the voltage $E_F$ from the delay circuit 28 will produce a sufficiently small net input to the amplifier 15 so that there will be no output pulses $E_O$ and the control rectifier 20A will turn OFF. With control rectifier 20A OFF, the voltage $E_A$ will again appear and the negative feedback voltage $E_F$ will decay. When voltage $E_F$ has decayed sufficiently, the input signal $E_1$ will, if present, produce output pulses $E_O$ to again turn ON the control rectifier 20A. This ON-OFF action continues to pulse the power to the load M so long as the signal $E_1$ persists and at a relatively low pulse rate dependent upon the effective values of resistors 29 and capacitor 30.

When the controlled rectifier 20A is turned ON as the result of a large input voltage $E_1$, then the negative feedback voltage $E_F$ may not be great enough to reduce the net input to the amplifier sufficiently to eliminate the pulses $E_O$ in which case the motor M is continuously energized until such time as the voltage $E_1$ decreased to a value such that the above described pulsing action can begin. Thus, the delayed negative feedback signal $E_F$ provides energization of motor M which is either continuous or pulsating and in which the pulsating power produces a greater average power to the motor as the input voltage $E_1$ increases.

Similarly, when the controlled rectifier 20B is turned ON by an amplifier output voltage $E_O$ of opposite polarity, it is switched OFF by the feedback voltage $E_F$ from the delay circuit 28 and then ON again when the delay signal sufficiently decays. Again, the continuous or pulsating action continues so long as the input signal $E_1$ exists.

Accordingly, for either selected rotation of the motor M, the motor speed decreases as rebalance of the network 46 is approached, so to minimize overshooting. There is now described an arrangement which positively stops the motor as it approaches its limit of travel in either direction; i.e., the fully-open or fully-closed position of valve 60.

As the motor M closely approaches either limit of its travel, a corresponding one or the other of the preset limit switches A110, B110 is closed effectively to block that signal channel which otherwise could pass pulses demanding further excitation of the motor in that direction. In FIG. 1, the limit switches A110, B110 are respectively actuated by the motor-driven limit cams A111, B111 and respectively provide a short-circuit across the isolation transformers 17A, 17B of the signal channels. At the same time either of these limit switches is closed to deactivate that signal channel which has been passing the output pulses, the limit switch 112 is closed as by cam C111 to effect energization of relay 113. The resulting closure of relay contacts 115 effectively blocks any further application of input signal $E_1$ as by establishing a short-circuit across input winding 51 of the amplifier. In consequence, the sole input to the amplifier 15 is now the unopposed feedback voltage $E_F$. This voltage, being opposite in polarity to $E_1$, is now effective to produce output voltages $E_O$ of reverse polarity which are directed by the diodes 16A, 16B to the unblocked signal channel and therefore result in brief reverse energization of motor M quickly and positively to bring it to a stop. Such reverse energization is of short duration because the feedback voltage $E_F$ decays as the reverse energization restores equality of the voltages $E_A$, $E_B$.

Upon the aforesaid closure of switch 112, the relay 113 is energized by the charging current of capacitor 114 from a D.C. source 83. When the charging current pulse falls below the hold-in value of the relay, the relay contacts 115 open. Within the period of energization of relay 113, the motor 15 is quickly stopped, as above described, by its reverse energization due to the continuance of the signal $E_F$ with input $E_1$ shorted out.

So long as the motor is at a limit of its travel, the corresponding limit switch A110, or B110, remains closed so that any signal $E_1$ of the polarity responsible for the motor being at that limit is ineffective to cause further energization of the motor. After deenergization of relay 113, a signal $E_1$ of opposite polarity can be passed by the unblocked signal channel to effect energization of the motor in reverse sense to open the closed one of limit switches A110, B110, so to restore both channels for normal operation. With the limit switch 112 now also open, the capacitor 114 discharges through a leakage path either existent within the capacitor when of the electrolytic type or which is provided by an external resistance of suitably high magnitude.

Figure 2:
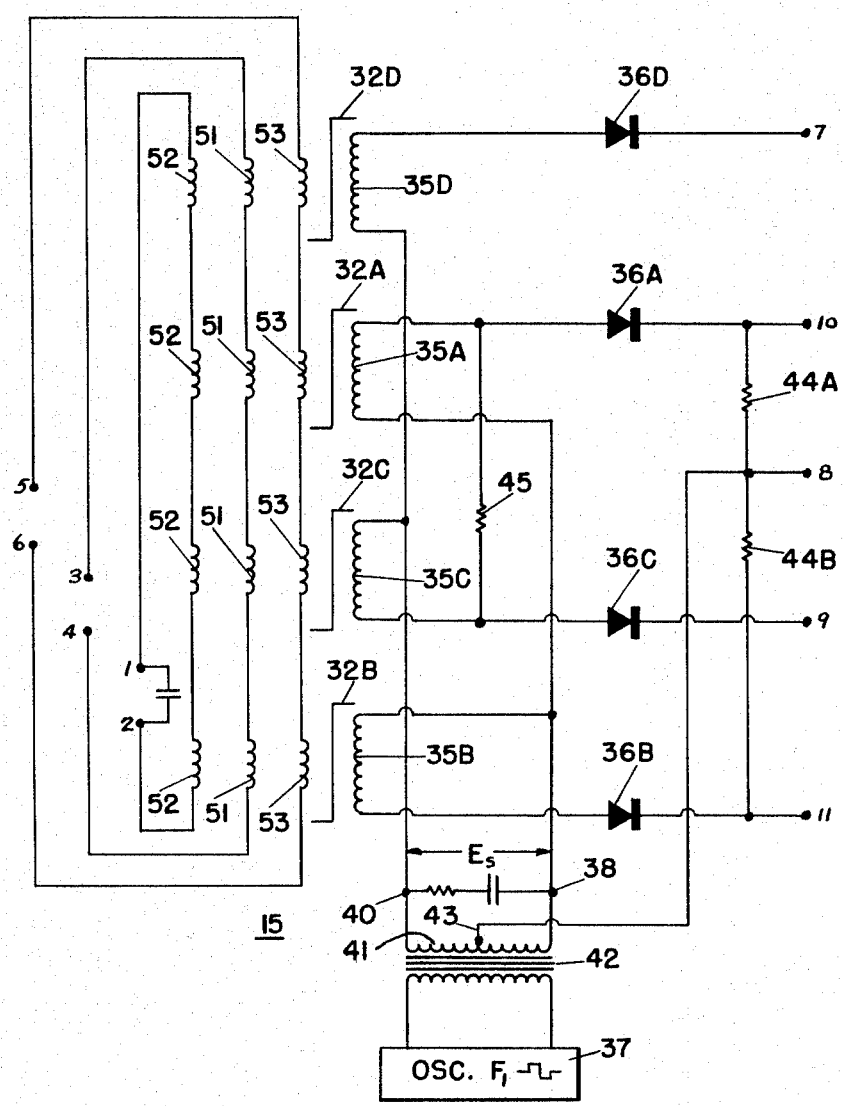
FIG. 2 is a circuit diagram of the magnetic amplifier shown in block form in FIGS. 1 and 3.

The magnetic amplifier 15 of FIG. 1 above discussed and of FIG. 3 later described is of the push-pull type: preferably it embodies features disclosed and claimed in copending Cockrell application, Serial No. 258,267, filed February 13, 1963. As shown in FIG. 2, the magnetic amplifier 15 comprises four saturable cores 32A–32D respectively having output windings 35A–35D.

The output winding 35A of core 32A is connected in series with a diode 36A between the output terminal 10 of the amplifier and the terminal 38 of a source of core-switching voltage $E_s$. The output winding 35B of core 32B is connected in series with the diode 36B between the output terminal 11 of the amplifier and the aforesaid terminal 38. The output winding 35C of core 32C is connected in series with the diode 36C between the output terminal of the amplifier and the terminal 40 of the core-switching voltage source. The output winding 35D of core 32D is connected in series with the diode 36D between output terminal 7 of the amplifier and the aforesaid switching voltage terminal 40. Terminals 38 and 40 may be the end terminals of the secondary 41 of transformer 42 whose primary is energized from any suitable source of frequency $F_1$, for example, a squarewave pulse generator or oscillator 37 having, for example, a repetition frequency of 5 kilocycles per second. The intermediate or center tap terminal 43 of source $E_s$ is connected via mixing resistors 44A, 44B respectively to the amplifier output terminals 10, 11.

The pair of cores 32A–32B and diodes 36A–36B form one-half of a full-wave circuit: the pair of cores 32C–32D and diodes 36C–36D form a second half. All cores are inductively coupled in push-pull relation by the input winding 51 common to all cores and connected to the signal input terminals 3, 4.

With the magnetic amplifier of FIG. 2 thus far described and assuming a given polarity of input signals, when the switching voltage terminal 38 is positive with respect to the center tap 43, the output windings 35A, 35B of the first pair of cores 32A, 32B drive these cores to saturation in one sense from a preset level, the extent of change of flux level of one of these cores depending upon the magnitude of the input signal; and when the switching voltage terminal 40 is positive with respect to center tap 43, the output windings of the second pair of cores 32C, 32D drive them to saturation in one sense from a preset flux level, the extent of change level of one of the cores depending upon the magnitude of the input signal. This setting or gating of the cores is the same as with conventional push-pull full-wave magnetic amplifiers.

As more fully explained in the aforesaid Cockrell application, the resetting of the cores of both pairs back to their original respective levels is accomplished by addition of a single resistor 45 to the amplifier circuitry as above described. Specifically, the resistor 45 is connected between the anodes of the diodes 36A, 36C.

Briefly, during each positive half-wave of the core-switching voltage $E_s$, the cores 32A, 32B of one push-pull pair are driven or set by the switching pulses to produce across the amplifier output terminals 10, 11 a D.C. voltage pulse $E_O$ of polarity dependent upon that of the input voltage $E_1$ and of magnitude corresponding with the input voltage $E_1$ times the amplifier gain; the core 32C of the second pair of push-pull cores is reset by direct coupling through resistor 45 to the source of switching voltage $E_s$ and the core 32D of the second pair is reset by its inductive coupling to the input circuit including winding 52 common to all cores. The diodes 36C–36D are not conductive for this half-cycle of the core-switching voltage $E_s$.

Similarly, during each negative half-wave of the core-switching voltage $E_s$, the cores 32C–32D of the second pair of push-pull cores are set or driven by the switching pulse to produce across the amplifier output terminals 7, 9 a D.C. voltage $E_O$ of magnitude corresponding with the input voltage $E_1$ times the amplifier gain and of the same polarity as produced for the positive half-waves of switching voltage $E_s$; the core 32A of the first pair of push-pull cores is reset by direct coupling through the same resistor 45 to the source of switching voltage $E_s$; the core 32B of the first pair is reset by its inductive coupling to the input circuit including winding 52 common to all cores. The diodes 36A, 36B do not conduct for this half-cycle of the switching voltage.

The input winding 52 common to all cores 32A–32D, like the input winding 51, is inductively coupled to them in push-pull relation. In the system of FIG. 1, the feedback signal $E_F$ is applied to the terminals 1, 2 of winding 52 so that its effect upon the cores is in sense opposite to that of the initiating input signal $E_1$. For the system of FIG. 1, the input winding 53 has not been used and may be omitted. As later explained in discussion of the system of FIG. 3, it is there used for adjustment of the gain of the magnetic amplifier. For use in the system of FIG. 1, the magnetic amplifier of FIG. 2 is used with its terminals 7 and 10 connected together and its terminals 9 and 11 connected together.

Figure 3:
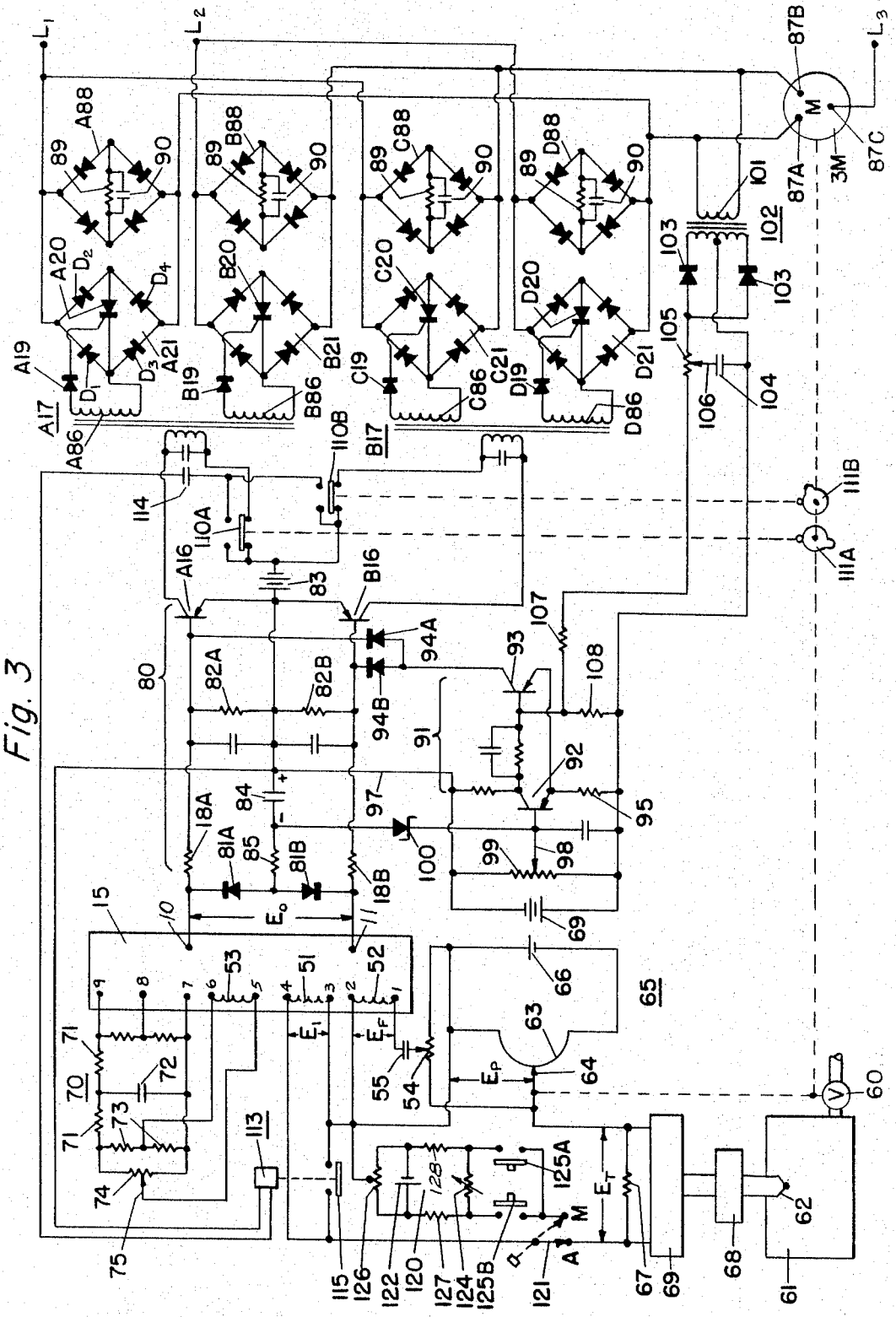
FIG. 3 schematically illustrates a modification of the system of FIG. 1 in which the motorized drive unit is selectively energized from a three-phase power source.

The control system shown in FIG. 3 is basically similar to that of FIG. 1. The selectively energized load 3M is a three-phase motor for positioning the input valve 60 of a gas-fired furnace 61 in response to changes in furnace temperature as measured by thermocouple 62. Concurrently with its adjustment of valve 60, the motor M also adjusts the position of slidewire 63 relative to its contact 64 so that the voltage $E_P$ across the effective portion of the slidewire is representative of valve position. This output voltage of the potentiometer network 65, including the slidewire 63 and a D.C. source exemplified by battery 66, is in opposition to the voltage $E_T$ appearing across resistance 67 and derived from the thermocouple voltage. The block 68 is a transmitter that responds to the voltage from thermocouple 62 to produce an output current proportional to the thermocouple voltage. The transmitter of block 68 may be of the type shown in Patent 2,901,563. The current from the transmitter 68 is then applied to a controller represented as block 69 for the automatic control of the temperature of furnace 61. The controller 69 will include a set point adjustment for establishing the desired temperature to be maintained together with adjustments of any one or more of the control actions commonly known as proportional action, integral action and derivative action. The controller 69 may be of the type shown in Patent 3,092,321 to produce a current flow through resistor 67 which varies with change in temperature of thermocouple 62 to provide a voltage $E_T$ representative of the desired position of the valve 60.

At any given instant, the signal voltage $E_1$ applied to input terminals 3, 4 of the magnetic amplifier is the difference between the voltage $E_T$ and the slidewire voltage $E_P$. The polarity of the error signal voltage $E_1$ depends upon which of the voltages $E_T$, $E_P$ is the greater. The D.C. negative feedback voltage $E_F$ applied to input winding 52 of amplifier 15 is derived from change in position of slidewire 63 by the resistor 54 and capacitor 55 connected as shown.

As disclosed in connection with FIG. 1, the polarity of the output pulses $E_O$ of amplifier 15 is determined by the polarity of signal voltage $E_1$ and the magnitude of the output pulses $E_O$ is equal to the magnitude of the net amplifier input $(E_1-E_F)$ times the amplifier gain. In the system of FIG. 3, the amplifier gain may be adjusted by the slidewire 74 of network 70. Specifically, the pulse output of amplifier 15 as appearing across the mixing resistors connected to output terminals 7, 8, 9 is applied, via the filter comprising resistor 71 and capacitor 72, to slidewire 74 and the potential divider 73, 73. The center tap of the potential divider 73, 73 and the contact 75 of slidewire 74 are respectively connected to the input terminals 5, 6 of the amplifier. With the contact 75 in mid-position, the input winding 53 of the amplifier cores 32A–32D receives no current due to existence of output pulses $E_O$ and the normal amplifier gain is realized. With contact 75 displaced in one direction from its center position, the feedback current in input winding 53 of the cores is in sense to reduce the amplifier gain by a degenerative action whereas with contact 75 displaced in opposite direction from its center position, the feedback current in input winding 53 of the cores is of polarity effective to increase the amplifier gain by a regenerative action.

In the system of FIG. 3, the output pulses $E_O$ of amplifier 15, as appearing across resistors 82A, 82B, are directed to one or the other of the isolation transformers A17–B17 of the respective channels in dependence upon the pulse polarity by transistors A16, B16 which not only serve as polarity-sensitive means but also provide signal gain. Specifically, the emitter electrodes of these transistors are connected to the common terminal of the resistors 82A, 82B and the end terminals of these resistors are respectively connected to the base electrodes of the transistors. Thus, with the output terminals 10, 11 of the amplifier connected to the end terminals of the resistors 82A, 82B through series resistors 18A, 18B, one or the other of transistors A16, B16 will amplify the output pulses. The collector-emitter circuit of transistor A16 of one signal channel includes the primary of isolation transformer A17 and the collector-emitter circuit of transistor B16 of the other channel includes the primary of isolation transformer B17. The D.C. current source, exemplified by battery 83, is common to the collector-emitter circuits of both transistors.

Assuming the polarity of the output pulses $E_O$ to be such that they are repeated by the transistor A16, the resulting A.C. output of the secondary winding A86 of transformer A17 is rectified by diode A19 for gating of the controlled rectifier A20, thus to switch the power diode bridge A21 ON at the beginning of each half-wave of the power-line frequency. At the same time the A.C. output of the secondary winding B86 of transformer A17 is rectified by diode G19 for gating of the controlled rectifier B20 to switch the diode bridge B21 ON at the beginning of each half-wave of the power-line frequency. With the bridges A21 and B21 of the first signal channel switched ON, the power-line conductors L1 and L2 are respectively connected to the terminals 87A and 87B of the three-phase motor 3M. The third motor terminal 87C is directly connected to conductor L3 of the three-phase power line. Consequently for both half-waves of the power-line frequency, all windings of the motor are energized in a particular phase relation to effect rotation of the motor in direction determined by the polarity of the output pulses $E_O$ of the amplifier 15.

Conversely, assuming that the transistor 81B of the second signal channel is repeating an output signal $E_O$ of opposite polarity, the A.C. output of the secondary winding C86 of transformer B17 is rectified by diode C19 for gating of the controlled rectifier C20 to switch the diode bridge C21 ON. At the same time, the output of secondary winding D86 of transformer B17 is rectified by diode D19 to gate the controlled rectifier D20 to switch the diode bridge D21 ON. With the diode bridges C21, D21 of the second signal channel switched ON, the power-line conductors L1–L2 are respectively connected to terminals 87B and 87A of the motor in a reverse phase relation so to effect motor rotation in the opposite direction.

The diode bridges A88–D88 respectively in shunt to the power-diode bridges A21–D21 are for suppression of switching transients. Although each of these bridges, unlike bridges A21–D21, is continuously conductive, its effective series-impedance at the power-line frequency $F_2$ is high and corresponds with that of resistor 89 whose resistance may be of the order of 100 kilo-ohms. Consequently, the current passed by bridges A88–D88 to the load is of insignificant magnitude. The resistor 89 of each bridge is shunted by capacitor 90 having, for example, a capacitance of 2 microfarads and with it forms a dissipating network of low impedance to the switching transients.

With the arrangement of FIG. 3 as thus far described, there is possibility that because of non-uniformity of their gating characteristics, only one of a pair of controlled rectifiers A20, B20 or C20, D20 may be turned ON by a low-level output signal $E_O$ as appearing in the output circuit of transistors A16 or B16. In such event, only two windings of the motor would be energized. Thus for low-level signal inputs to the amplifier, the motor would not only not rotate to effect a corrective change of the setting of valve 60 but could also be damaged by the heavy current drawn under a stalled motor condition. To avoid such possibility, the system of FIG. 3 is provided with an arrangement which prevents any of the controlled rectifiers A20–D20 from being switched ON unless the signal level is sufficiently high to insure current-switching to the ON state of both controlled rectifiers of each pair.

For low-signal levels, the bases of the transistors A16, B16 are clamped with positive polarity with respect to their emitters by the diodes 94A, 94B respectively. These diodes are disposed in a path including the normally ON transistor 93 of a Schmitt trigger circuit 91, the common emitter resistor 95, current source 96 and the conductor 97. The transistor 92 of the trigger circuit is biased to its normally OFF state by connection of its base to the adjustable contact 98 of the potentiometer 99 connected across battery 96.

When the level of the output pulses $E_O$ is sufficiently high to insure gating of all controlled rectifiers associated with each signal channel, the trigger circuit 91 is effective to remove the clamping bias of the transistors A16, B16 in manner now described in response to a trigger input voltage developed across capacitor 84.

For output pulses $E_O$ of such polarity that terminal 10 of amplifier 15 is positive with respect to terminal 11, the pulse current flows in the path including resistor 18A, resistor 82A, capacitor 84, resistor 85 and diode 81B. For output pulses $E_O$ of opposite polarity, the pulse current flows in the path including resistor 18B, resistor 82B, capacitor 84, resistor 85 and diode 81A. For either polarity of pulses $E_O$, the capacitor 84 is charged in the same sense with the polarity indicated in FIG. 3: i.e., the capacitor terminal connected via conductor 97 to the upper terminal of potentiometer 99 is always "positive" and the capacitor terminal connected via the Zener diode 100 to the base electrode of input transmitter 92 of the trigger circuit is always "negative."

When the voltage appearing across capacitor 84 exceeds the difference between the breakdown of the Zener diode 100 and the bias voltage across the upper portion of the potentiometer 99, the input transistor 92 of the trigger circuit 91 is switched to the ON state and it in turn switches the output transistor 93 to the OFF state. In consequence, the clamping bias is removed from the base electrodes of the transistors A16, B16 and one or the other of them, depending upon the polarity of the output pulses $E_O$, passes the pulses to a corresponding one of the transformers A17, B17 and at a level which insures that both controlled rectifiers of the associated pair, i.e., A20, B20 or CD20, D20 are gated by the pulses.

In order to provide a stable operation of the motor 3M to adjust the valve 60 to positions corresponding to the voltage $E_T$ without recourse to an excessively wide deadband, a velocity feedback signal is applied to an input of the amplifier 15 in accordance with the rate of change of position of the contact 64 relative to the slidewire 63. This velocity feedback signal is developed by applying the voltage $E_P$ to a potentiometer 54. The selected fractional output from the potentiometer 54 is applied by way of the capacitor 55 to the terminal 1 of input winding 52 of the amplifier 15. By virtue of the capacitor 55, the voltage $E_F$ is representative of the rate of change of the voltage $E_P$. This velocity feedback greatly reduces the tendency of the control of motor 3M to be unstable and so produce hunting around its desired position.

Notwithstanding the use of velocity feedback, it is still necessary to provide a dead-band for stable operation of the system. In order to further reduce the size of the dead-band that can be employed while providing stable operation, the system of FIG. 3 derives from the A.C. voltage appearing across terminals 87A, 87B of the load 3M a pulsating D.C. signal which for progressively smaller output pulses $E_O$ is increasingly effective to turn OFF the trigger circuit 91 after it has been switched ON as above described. Specifically, the primary 101 of transformer 102 is connected across the switched conductors connected to motor terminals 87A, 87B. The output of the transformer 102 is rectified by diodes 103 and is applied to the input or base resistor 108 of the output transistor 93 of the trigger circuit 91 in series with fixed resistor 107 and the potentiometer resistor 105. The shunt capacitor 104 of the output network is connected to the movable contact 106 of potentiometer 105. Moving contact 106 to the right shortens the charging time and increases the discharge time of capacitor 104 and thus the interval of energization of motor 3M and the resulting resetting of the trigger circuit to the normally OFF state is decreased. Conversely, moving contact 106 to the left increases the time required to charge the capacitor 104 to the voltage required for resetting of the trigger circuit. Thus, during continued existence of an output signal $E_O$ sufficient to turn ON the trigger circuit, the ratio of the ON-OFF times of the controlled rectifiers and therefore the average speed of motor 3M depends upon the selected setting of contact 106. Because this results in bursts of power applied to motor 3M for small outputs $E_O$ from amplifier 15 rather than full power, the dead-band may be reduced without producing instability. This action is similar to that obtained in FIG. 1 by the network 28 and associated circuitry. The additional circuitry of FIG. 3 now described is generally similar to that of FIG. 1 in that it provides for brief reverse energization of the motor when valve 60, or equivalent, has reached a limit position quickly to bring the motor to rest at the limit. Normally, the limit switches 110A, 110B are in the lower closed-circuit positions shown in FIG. 3 to includes the primaries of transformers A17, B17 in the output circuits of transistors A16, B16 as above described. For purpose of explanation, it will be assumed that the gating pulses passed by transformer A17 effect energization of the motor in valve-opening direction and that the gating pulses passed by transformer B17 effect energization of the motor in valve-closing direction.

When the valve 60, as moved by the motor in valve-opening direction, reaches its fully open position, the cam 111A moves the switch 110A from its lower closed-circuit position to exclude the primary of transformer A17 from the first signal channel so to preclude further energization of the motor in sense tending to effect further opening of the valve. The above operation will permit the motor 3M to coast to a stop due to the inertia of the motor and its load. Such coasting is not desirable when the valve or other final control element is near either limit of its travel because of the possibility of jamming the operating mechanism. In order to more precisely stop motor 3M at a limit, the limit switch 110A in its upper closed-circuit position connects the coil of relay 113 in series-circuit with the current source 83 and the capacitor 114. The resulting closure of contacts 115 of relay 113 short-circuits the input terminals 3, 4 of the magnetic amplifier 15 so temporarily to eliminate any input signal $E_1$ calling for further valve-opening movement. With the feedback signal $E_F$ of magnitude related to the rate of change of position of contact 64 and of opposite polarity still applied to the amplifier 15, the output signal $E_O$ is now of reversed pulse polarity. This signal as passed by the transistor B16 of the second signal channel through limit switch 110B to transformer B17 and controlled rectifiers C20–D20 is effective to cause reverse energization of the motor until the rate of change of position of contact 64 is substantially zero, i.e., at standstill. The contacts 115 of relay 113 open when the charging current of capacitor 114 falls below the drop-out value of the relay.

So long as the limit switch 110A remains closed in its upper-circuit position, the first signal channel remains blocked and no signals calling for further valve-opening movement can be passed to the transformer A17. However, for any output signals $E_O$ of polarity calling for valve-closing movement, they are passed by transistor B16 and limit switch 110B to the transformer B17 of the second signal channel.

In like manner, when the valve 60, as moved by the motor in valve-closing direction, reaches fully closed position, the cam 111B moves the limit switch 110B to preclude passage of any further signals of polarity tending to further close the valve and effects brief energization of the relay 113 to eliminate the input signal $E_1$ calling for further valve-closing movement; the still applied feedback signal $E_F$ being of opposite polarity effects reversal of polarity of the output pulses $E_O$ to cause energization of the motor in reverse sense and so bring it quickly to a stop. The other limit switch 110A being in its lower position, permits the passage of subsequent signals calling for opening movement of the valve.

In the arrangement thus far described, the motor is automatically controlled to effect change in position of the valve 60 in response to changes of the controlled condition. Occasion arises when it is desirable that the valve 60 be put under manual control. To shift between automatic and manual control, the system of FIG. 3 is provided with a transfer switch 121. With this switch in the full-line position shown, the input or error signal $E_1$ applied to the magnetic amplifier 15 is derived from the valve-position slidewire 63 and the signal $E_T$. With the transfer switch 121 closed in its dotted-line position, a command signal $E_1$ of either polarity and of desired magnitude derived from network 120 may be selectively applied to amplifier 15 by operating one or the other of the push-button switches 125A, 125B of that network.

Specifically, the input terminals 3 and 4 of the amplifier 15 are respectively connected to the mid-point of resistor 126 of network 120 and to the movable contact of the transfer switch 121. The D.C. current source, exemplified by battery 122, is connected across resistor 126 and also across the series combination of fixed resistor 127, rheostat 124 and fixed resistor 128. The end terminals of the variable resistor 124 are respectively connected to one side of the push buttons 125A, 125B. The other side or terminal of each of the push buttons is connected to the fixed "manual" contact of the transfer switch.

Under steady-state conditions, the error signal $E_1$ corresponding with the difference between the slidewire signal $E_P$ and the signal $E_T$ is zero. Thus, when the transfer switch 121 is thrown from automatic to manual position, the transfer produces no abrupt change in position of the valve 60 because the output signal of network 120 is also zero. With the transfer switch now in the "manual" position, the valve 60 may be manually adjusted in either direction by depressing a corresponding one or the other of the push buttons 125A, 125B. The rate at which the valve is moved by motor 3M under manual control may be preset by adjustment of the rheostat 124 of network 120. Because the feedback voltage remains in circuit during manual operation, it produces a braking action similar to that produced at the limits and the tendency for the motor to coast is overcome.

It shall be understood the invention is not limited to the particular arrangements disclosed and described and that equivalents or modifications thereof are within the scope of the invention as defined by the appended claims.

What is claimed is:

1. A control system comprising
    a magnetic amplifier having input and output circuits, said amplifier in response to a D.C. signal input producing output pulses of polarity dependent upon the polarity of the D.C. signal input,
    a pair of signal channels,
    polarity-sensitive means for directing said output pulses to one or the other of the signal channels of said pair in dependence upon the polarity of said amplifier output pulses,
    rectifier circuits respectively associated with the channels each for producing a D.C. output signal from pulses directed to that channel,
    means for isolating the rectifier circuits of the channels from each other selectively to produce isolated D.C. signal outputs in dependence upon the polarity of the D.C. signal input to said amplifier, and
    controlled rectifiers associated with the signal channels for gating by said isolated D.C. signal outputs.

2. A control system as in claim 1 additionally including load means selectively energized from an A.C. power source through said controlled rectifiers, and in which the repetition frequency of the amplifier output pulses is high with respect to the frequency of said power source.

3. A control system as in claim 1 additionally including control means selectively energized from a power source through the controlled rectifiers, and means responsive to energization of the control means periodically to interrupt production of any isolated D.C. signal output by the selected signal channel.

4. A control system as in claim 1 in which there are two controlled rectifiers associated with each signal channel for energization of a three-phase load means from a three-phase power source, and which additionally includes amplitude-responsive means preventing gating of either of said controlled rectifiers by pulses of either polarity unless the pulse-amplitude is sufficiently high to insure gating of both of them.

5. A control system as in claim 4 additionally including means responsive to energization of the load means for periodically disabling said amplitude-responsive means.

6. A control system as in claim 3 in which the responsive means derives from the selected energizations of the control means a negative feedback D.C. input signal for said amplifier and includes a time-delay means for such derived signal.

7. A control system as in claim 2 in which the load means includes a reversible motor selectively energized from a power source through the controlled rectifiers, and which also includes means for producing a negative-feedback D.C. signal for said amplifier and whose magnitude is a function of the speed of said motor.

8. A control system for selectively controlling the energization of a control means from an A.C. power source comprising a magnetic amplifier having input and output circuits, said amplifier in response to a D.C. signal input producing output pulses of polarity dependent upon the polarity of the D.C. signal input and of frequency higher than that of said A.C. power source, a pair of polarity-sensitive means in the output circuit of said amplifier and one or the other of which, depending upon the polarity of said pulses, produces a gating signal, and means including controlled rectifiers selectively responsive to gating signals respectively produced by said polarity-sensitive means for selectively energizing said control means from said A.C. power source.

9. A control system as in claim 8 in which the control means is a reversible motor for operating a valve and which additionally includes a balanceable network including means for producing a D.C. error signal representative of the difference between valve position and a measured variable;

a second network including a pair of normally open switches selectively manually operable to produce a D.C. command signal of either polarity and of desired magnitude, and a transfer switch for connecting one or the other of said networks in the input circuit of said amplifier.

References Cited by the Examiner
UNITED STATES PATENTS 3,083,327 3/1963 Byloff.
3,183,425 5/1965 Slawson _____ 318—227

ORIS L. RADER, *Primary Examiner.*

G. Z. RUBINSON, *Assistant Examiner.*